(12) United States Patent
Foxx et al.

(10) Patent No.: US 7,898,421 B2
(45) Date of Patent: Mar. 1, 2011

(54) MED-MONOTYPE (KNOWN AS "THE EYE"), A SYSTEM AND EQUIPMENT FOR COLLECTING AND VERIFYING SERVICE PERFORMANCE DATA

(76) Inventors: James Foxx, Greensboro, NC (US);
Edward J. Riggs, Greensboro, NC (US)

( * ) Notice: Subject to any disclaimer, the term of this patent is extended or adjusted under 35 U.S.C. 154(b) by 232 days.

(21) Appl. No.: 12/082,068

(22) Filed: Apr. 9, 2008

(65) Prior Publication Data
US 2008/0291028 A1 Nov. 27, 2008

(51) Int. Cl.
*G08B 13/14* (2006.01)
(52) U.S. Cl. .............. 340/572.8; 340/572.4; 340/572.1; 340/573.1; 340/540; 340/541; 340/309.7; 340/5.21; 340/5.71; 340/5.8; 705/10; 705/2; 705/16; 235/377; 235/382; 235/385
(58) Field of Classification Search .............. 340/572.8, 340/572.4, 572.1, 573.1, 540, 541, 309.7, 340/5.21, 5.71, 5.8; 705/1, 2, 16; 235/377, 235/382, 385
See application file for complete search history.

(56) References Cited

U.S. PATENT DOCUMENTS 5,497,141 A * 3/1996 Coles et al. .............. 340/309.7
7,114,648 B2 * 10/2006 Ginskey et al. ............. 235/377

* cited by examiner

*Primary Examiner*—Tai T Nguyen

(57) ABSTRACT

A system of equipment, communication networks, and computer programs automates the recording of worker identity, location, arrival time and departure time at multiple worksites of workers in a mobile field workforce. The equipment comprise a location identifying means, an operator identifying monitor, and a data processing means having connectivity to a data communicating means such as the Internet. The location identifying means may comprise an optically sensed label, magnetic striped card, a radio frequency interrogated tag, or an electrically connectable circuit. The monitor comprises a means to keep time, to scan, interrogate, or connect and communicate with the location identifying means, and to communicate time, location, and operator identifying data over a network such as the public switched telephone network, internet, or cellular telephone network. Optionally, the monitor may also comprise other means such as an interface to charge and control a mobile phone, a magnetic card reader, and a biometric sensor such as a fingerprint scanner.

8 Claims, 9 Drawing Sheets

V_IN: WITHSTAND: 0 to +100
      OPERATE:   +6 TO +12

LOW DROP-OUT
I QUIESCENT = 400 nA

MED-MONOTYPE (KNOWN AS "THE EYE"), A SYSTEM AND EQUIPMENT FOR COLLECTING AND VERIFYING SERVICE PERFORMANCE DATA

BACKGROUND OF THE INVENTION

1. Field of the Invention

The field of the invention is equipment and systems for automated data collection and management of mobile workforce.

Field of Search: 705/2, 3, 4, 11, 21, 30, 32; 340/572.1, 572.8

2. Related Art

An unfulfilled requirement exists to be able to verify the location, arrival time and departure time of field workers in such areas as Medicaid service and in other areas, and to automate the collection and processing of these data. Prior art provides verifiable systems which rely on equipment too costly and too difficult to install and maintain except at centralized worksites. Prior art also provides methods to submit service information by telephone, but such systems provide data that are generally not verifiable and are prone to entry errors. These systems require a heavy burden of labor to capture and prepare the data for management, billing, and payroll. These systems of prior art tend to create work environments which encourage inaccurate and fraudulent entry of billable time. Other systems, such as taught by S. T. Kimmel in U.S. Pat. No. 7,209,886, provide solutions optimized for management at fixed locations such as health clinics.

Russell Bode (U.S. Pat. No. 7,089,200) describes a basic payroll system.

Dartigues et al. (U.S. Pat. No. 6,366,929) describe a "smart card" system for clinical settings.

Carroll et al. (U.S. Pat. No. 4,658,357) and (U.S. Pat. No. 4,549,264) describe a transmitter-transceiver system for hospital settings.

Wood et al. (U.S. Pat. No. 6,826,537) describe a health care accounting system.

BRIEF SUMMARY OF THE INVENTION

The invention of this disclosure is a system of equipment, communication networks, and computer programs which operate together to expedite and automate the recording of arrival and departure times of a mobile field workforce. This system uses the collected data to provide "near-real-time" reports for monitoring and management of the workforce and client base. It also transfers the data to billing and payroll systems, and provides "disinterested third party" reports to verify the accuracy of reported times and charges.

DETAILED DESCRIPTION OF THE INVENTION

Figure 1:
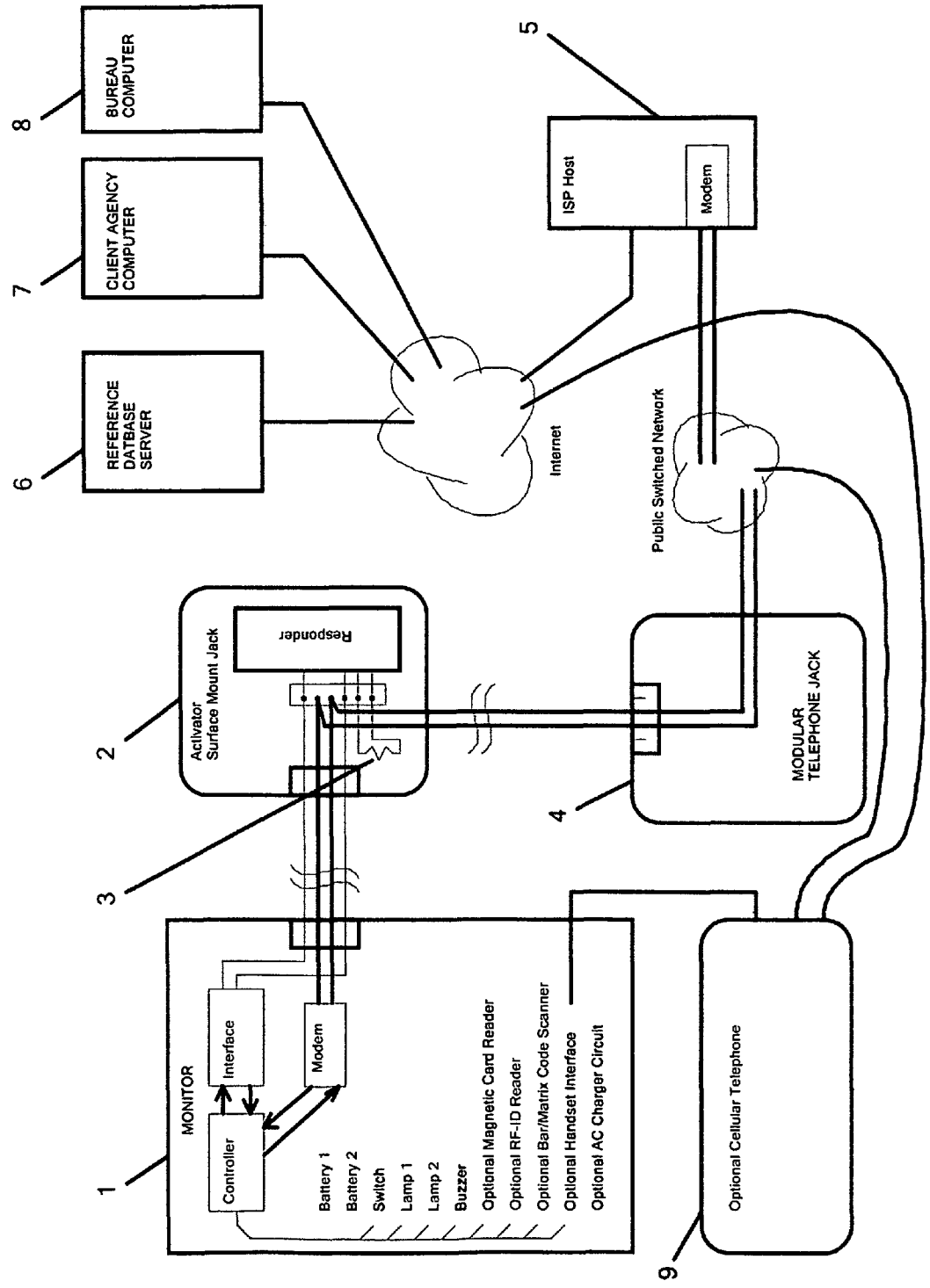
FIG. 1 is a block diagram showing the over-all relationship of the various hardware components and communication paths of a preferred embodiment of the present invention.

As shown in FIG. 1, the monitor 1 is an operator identifying means comprising a hand held case with a "first battery", a replaceable operating "second battery", wherein the use of the second battery is to power the time-keeping function during replacement of the "first battery", a push-button switch, two indicator lamps (red and green light emitting diodes), an acoustic buzzer, an interface circuit to communicate with a location identifying means 2; a modem connecting to a modular "R J11" jack for connection to the public switched telephone network; and a microcontroller to perform the required functions by way of stored program or "firmware". Additionally, since the location identifying means may optionally be a securely affixed magnetic striped card, a barcode or matrix code tag or placard, or a radio frequency responding tag (i.e. "RF-ID tag"), the monitor may be equipped with a magnet stripe card reader, a radio frequency ID tag interrogator ("reader"), and/or a barcode or matrix code scanner or reader.

Other options are an interface and connection to a cellular telephone handset and AC line powered charging circuit. When the monitor is equipped with a magnetic stripe card reader, point of sale functions may be enabled such as purchase of cellular telephone network minutes. The purchase of network minutes may also be achieved by online internet transaction.

Figure 3:
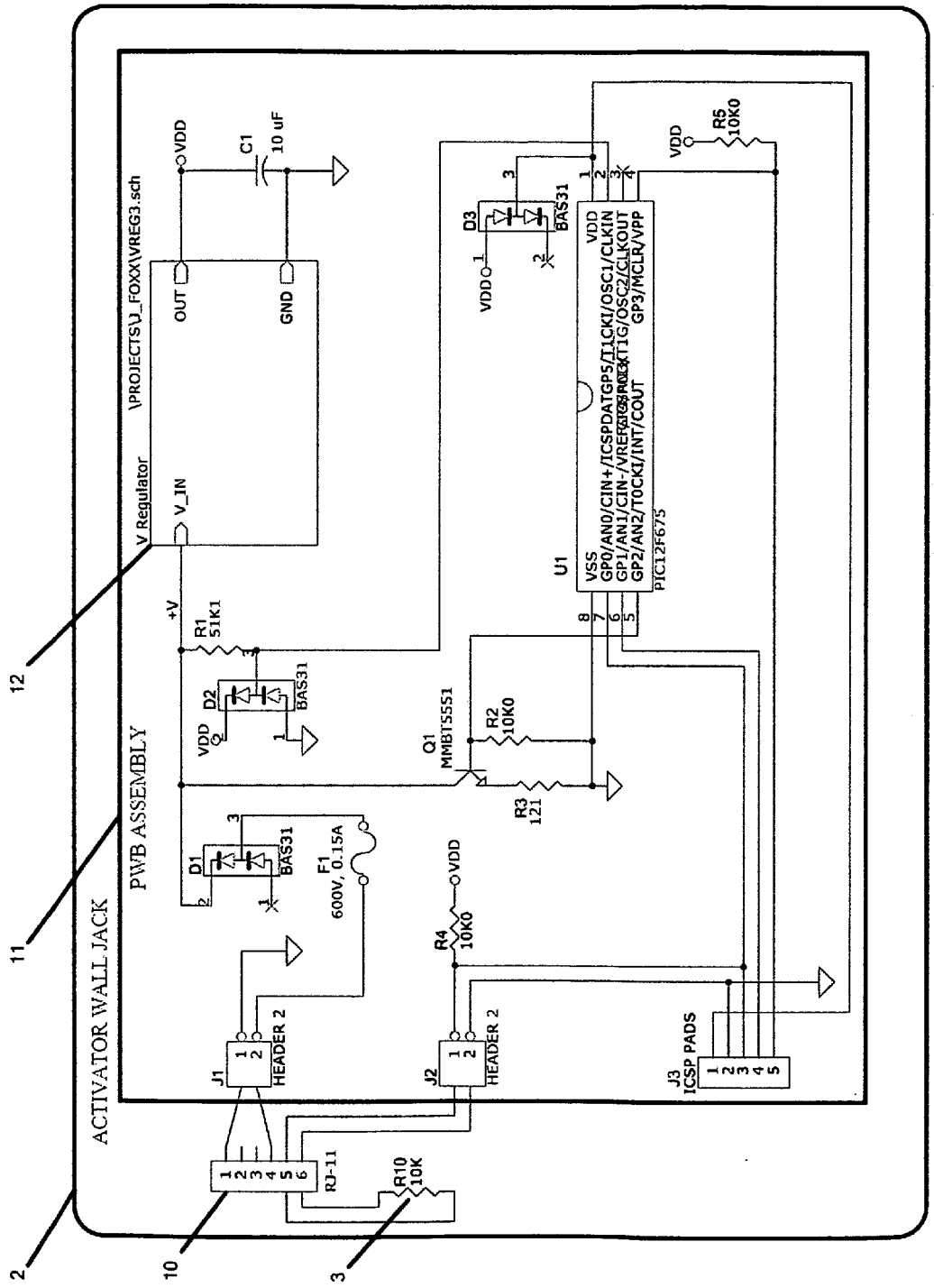
FIG. 3 is a schematic diagram of a preferred embodiment of location identifying means 2 of FIG. 1.
Figure 4:
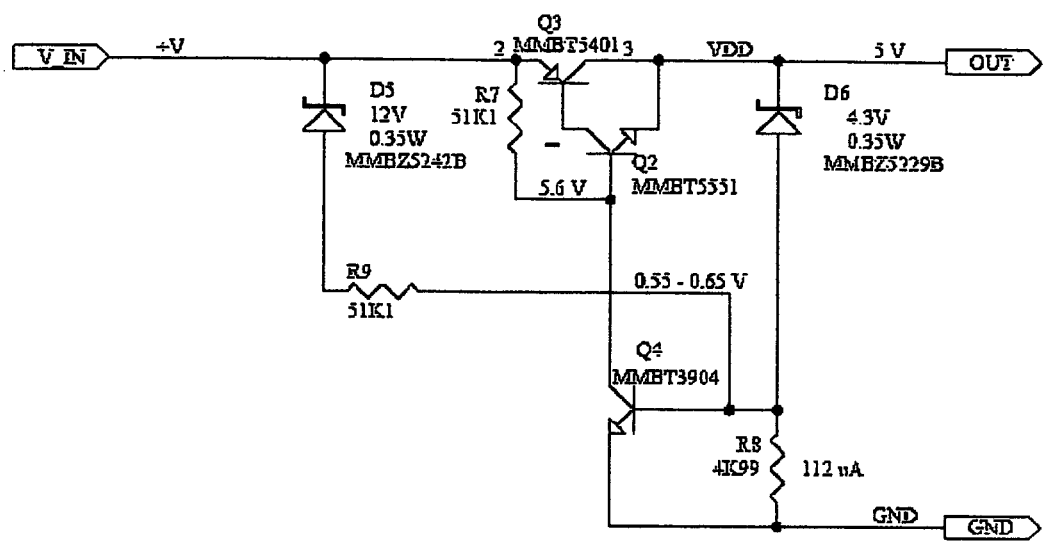
FIG. 4 is a schematic diagram of a preferred embodiment of voltage regulating means 12 of FIG. 3.

Location identifying means 2. Several options are available for this function, depending on the economics of the application. For the most transient worksites a securely affixed barcode or matrix code placard or coupon, tag, or pressure sensitive label is used. FIGS. 1, 3, and 4 show a form of location identification suitable for longer term use in home care. In these figures a modular surface mount jack provides convenient connection to the public switched telephone network through a residential landline. It also houses a responder circuit which connects only to the Monitor, using the yellow "Aux Ring" and black "Aux Tip" positions of the RJ-11 connector. The modem in the Monitor uses the red and green "Ring" and "Tip" connections to connect to the landline. The landline is connected to the red and green connectors only. The modular jack enclosure has two mounting holes to accommodate screws. These holes are reinforced with metallic grommets which provide electrical contact between a sensing circuit within the responder and the two ends of a stable resistive path within a tamper evident pad 3, an adhesive mounting pad. The location identifying means of FIGS. 1, 3, and 4 functions by being securely mounted to a permanent surface at the work site, and being connected to a telephone landline where available. In use, on arrival and on departure of the worker, the monitor is connected to the landline and to the responder circuit by separate circuits within a short RJ 11 modular cord, and the button on the monitor is depressed. The Monitor then provides operating power to the responder and sends an encoded command to the responder. The responder then measures the electrical resistance or conductance of the mounting pad and compares this value to the first value stored in non-volatile memory. If the difference between values is within a specified tolerance, the responder sends an encoded unique serial number to the monitor. The Monitor then connects to the public switched telephone network if the landline is available, and dials ISP host 5 an Internet access point, logs into the network, and sends an encoded message to the reference database server 6 containing the current time and date, the unique serial number of the monitor, and the unique serial number of the responder.

A tamper evident pad 3 is a securing means which, together with two fasteners, such as drywall screws, affixes location identifying means 2 to a permanent surface within the worksite. In the preferred embodiment this is a double-sided adhesive tape construction comprising a first layer of highly aggressive adhesive, a second layer of structural foam of sufficient thickness to conform to irregularities common to interior wall surfaces, a third layer of adhesive having controlled adhesive property less aggressive than that of the first layer, a fourth layer as a pattern of electrically conductive ink, plastic, or adhesive arranged as a meandering path connecting metallic grommets at the screw holes, a fifth layer as a ribbon either above or below the conductive layer arranged to break the conductive layer during removal of the securing means assembly after having been affixed to the bottom of location identifying means 2, two further layers of release paper which cover and protect the adhesive surfaces until use, a further removable conductive path as a ribbon or wire concealed within the release paper that protects the more aggressive adhesive layer and so arranged as to connect the two ends of the conductive meandering path. In use, the conductive meandering path may take the form of a logo or other artwork and presents a stable and measurable resistance or conductance between the screw hole grommets, and therefore across the sensing circuit of the responder. The shorting ribbon or wire in the release paper is removed with the release paper during proper installation of location identifying means 2 and tamper evident pad to provide a resistance value that is within a specified range only when location identifying means 2 tamper evident mounting pad 3 are properly, installed.

A modular telephone jack 4 is a typical customer premise connector to which location identifying means 2 may be connected, such as a modular jack.

A ISP host 5 is a dial-up access point for Internet service.

A reference database server 6 is an Internet connected server (computer or system of computers, programs, and other equipment) of a trusted, disinterested third party. The function of this system is to receive the messages from the monitors, decode the messages, extract the information from the messages and enter the information into one or more secure databases and journals. The reference database server system also prepares reports for the client agency computer 7 and for the funding and regulating bureau computer 8.

The client agency computer 7 is a system of one or more computers and programs of one of a plurality of clients having a workforce to manage and monitor. Programs operating in this system can be used by operators manually or automatically to request and receive a variety of reports from the reference database server, and to update the local database. Other programs manually or robotically (automatically) enter data fields in records of the billing system of the funding bureau. Options in these programs may also be set to provide automatic submission at specified dates and times, of the preset billing reports. In the case of a worker failing to log both arrival and departure at an assignment, a default duration (such as one hour) may be automatically entered with a flag symbol for such a record.

Various fields may be assigned as being editable only by authorized agency operators, as in the case of Medicaid fields for Location, Billing Code, and Diagnostic Code. These fields may be copied automatically by the programs from agency operator defined templates.

The funding and regulating bureau computer 8 is a system of one or more computers and programs of a funding or regulating bureau computer 8.

Programs operating in this system can be used by operators manually or automatically to request and receive a variety of reports from the reference database server. These reports may be sorted or keyed by such fields as Provider Number, County, Client, etc.

An optional cellular telephone 9 is a cellular telephone handset that must be able to interface with monitor 1 to provide connection on command of monitor 1, via the public switched telephone network, to an Internet portal such as dial-up Internet Service Provider ("ISP") server 5, and to provide communication through this portal to send messages to the server of reference database server 6. Ideally, the handset may be commanded to send data messages such as SMS or email messages directly through the cellular and Internet networks without having to dial-up an ISP. In the preferred embodiment the interface provides connection to a charging circuit in the monitor 1, and the first battery of this configuration is a fixed rechargeable battery of capacity sufficient to recharge the handset battery multiple times and operate the circuitry of monitor 1.

Figure 2:
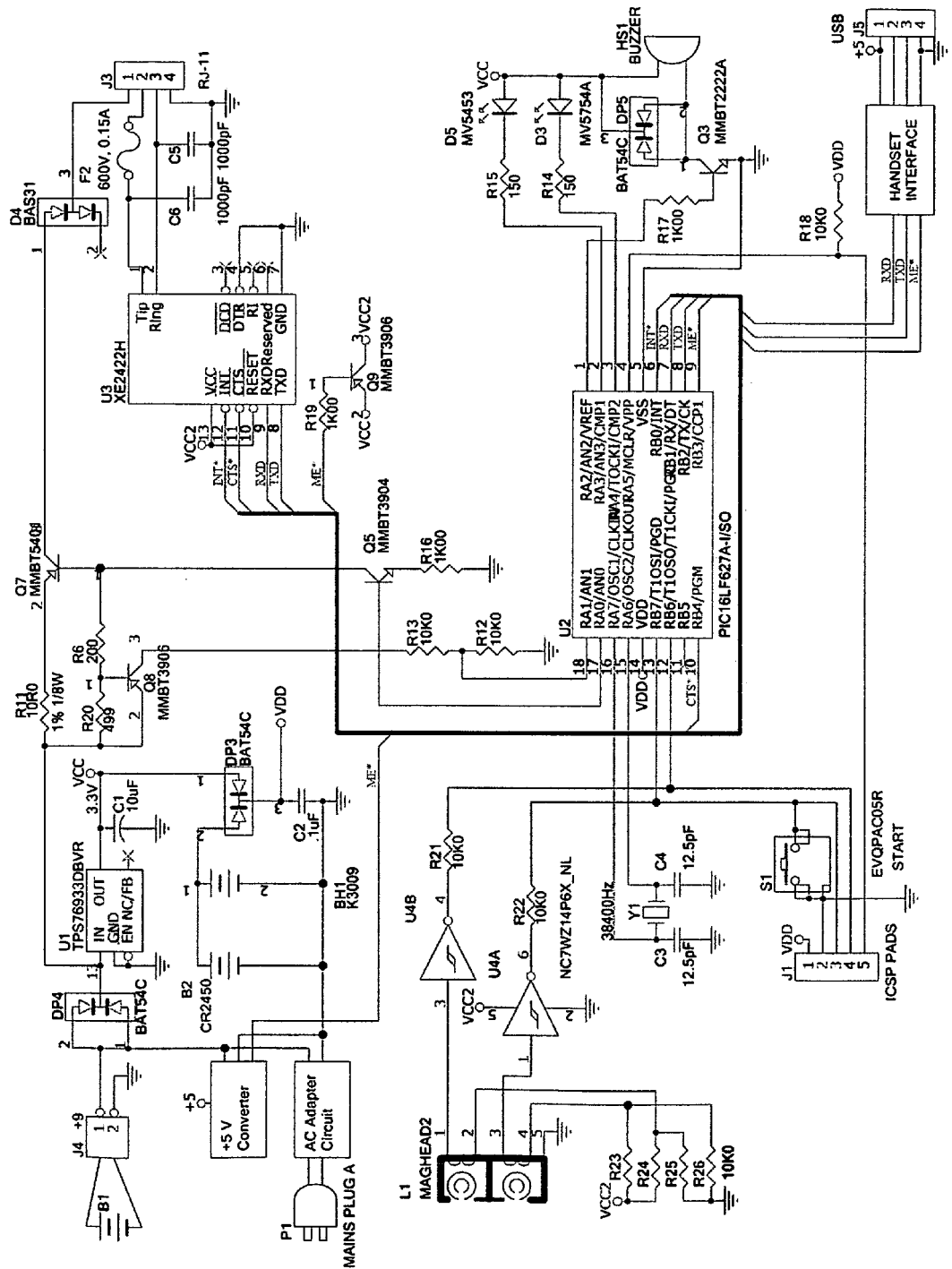
FIG. 2 is a schematic diagram of a preferred embodiment of monitor 1 of FIG. 1.

As shown in FIG. 2, B1 is the operating battery. In one embodiment it is a replaceable MN 1604 nine volt battery. In embodiments with cellular handsets, B1 is a fixed NiMH battery or lithium ion cell of 3000 mA Hr capacity or more.

P4 is a Schottky diode to prevent harm from a reversed battery. It is only needed in embodiments using a replaceable battery.

U11 is a 3.3 V. voltage regulator. It provides power source VCC.

C1 is a filter or bypass capacitor for VCC.

U2 is a low power microcontroller using Y1, C3 and 4 as a system clock and time reference for the calendar and time of day clock. It provides or controls all functions of the Monitor system.

R18 is a pull-up for the reset line for U2.

Q7 is a high voltage PNP bipolar transistor. Together with Q5, R16, 6, 20 and R1, Q7 forms a current limited switch. The microcontroller, U2, can apply a "logic 1" signal to Q5 to apply B1 battery voltage up to 50 mA to power the responder. With diode D4 to protect against reverse voltage, this circuit is able to withstand accidental connection to the landline.

Q5 is a PNP small signal transistor which functions with resistors R11, 5, and 20 to detect the flow of more than approximately 15 mA to the responder. The responder can signal the Monitor by modulating the level of current drawn from this supply. Resistors R12 and 13 form a voltage divider to scale the B1 voltage to a value more suitable for input to U2.

B2 is a 3.3 V. button cell in battery holder BH1. B2 powers U2, the microcontroller, only when B1: is' absent, reversed, or discharged.

DP3 is a pair of Schottky diodes. It isolates B2 and VCC to source VDD.

C2 is a filter or bypass capacitor for VDD.

U3 is a modem module for communicating through the landline. F2 protects the user and landline from excessive currents. C5 and 6 are high voltage capacitors to absorb transient voltages on the landline and filter the output signal of the modem to remove unwanted high frequency components.

Q9 is an NPN transistor which, with R19 and an output from U2, switches power supplied to U3, U4, and the optional handset interface.

D3 and D5 are the red and green light emitting diodes with current limiting resistors R14 and 15.

Q3, with resistor R17, switches power VCC to the buzzer, HS1, DP5 provides a return current decay path for the inductive buzzer current when 03 switches off.

L1 is a dual core magnetic stripe read head.

U4, together with voltage dividers formed by R24, 25 and R23, 26 provide an interface for L1 to U2.

J1 is a connection pattern for test and programming equipment.

S1 is a momentary contact push button switch.

J5 is a connector for the handset. The design of J5 and of the handset interface is specific to the handset used. Due to the large number of handset designs available, the example of a typical USB host must suffice for this discussion.

P1 is an optional type A plug for connection to 50/60 Hz power mains. The AC adapter and +5 V converter provide up to 0.5 Ampere of isolated, regulated 5.0 volt power to charge the fixed battery and the battery in a connected handset.

As shown in FIG. 3, location identifying means 2 is a modular R J11 surface mount jack housing the responder circuit assembly 11 comprising a voltage regulating circuit 12 able to withstand accidental connection to a landline as in FIG. 4, a connecting block 10, implemented as a set of four metallic screws able to bind wires from the four circuit modular jack and wire conductors from interior wiring telephone cable. Also represented are connections labeled 5 and 6, which comprise each a metallic grommet and mounting screw.

The tamper evident mounting pad 3, wherein R10 is the conductive meandering path.

J1 is a pair of solder points for connecting wires for Telco ring and tip circuits.

J2 is a pair of optional connection or test points.

D1 is a diode to protect the circuit from accidental connection to reversed ring and tip circuit voltages. F1 protects the circuit from damaging current transients.

R1 and D2 diode pack clamp the input voltage to acceptable values for input into microcontroller U1. U1 is a microcontroller with internal operating clock circuit and at least one channel of voltage measuring circuit ("A to D").

D3 isolates VDD during test and in-circuit programming, and R5 is a pull-up for the reset line.

Q1 is a high voltage NPN which, with R2-3, modulates the power level drawn from the supply circuit.

J3 is the in-circuit programming and test connection pattern.

R4 is a reference resistor which forms a voltage divider with R10. Since the value of R4 is accurately known, measurement of the voltage at the node common to R4-R10 allows accurate calculation of the value of R10. The voltage is measured as a ratio or fraction of VDD with reference to VSS, thus the precise value of VDD need not be known.

FIG. 4 is the schematic diagram of a voltage regulator circuit that protects the supplied circuitry from excessive input voltage, consumes little quiescent current, and operates with input voltage that exceeds output voltage by as little as one volt.

Q3, a PNP, and Q2, an NPN, are high voltage transistors forming a pseudo-Darlington pair. This configuration has the high gain needed to use a high value for load resistor R7 to minimize power at high input voltage. It also permits the pair to conduct when the input voltage is only slightly higher than the base-to-emitter voltage of Q2, or about 0.7 volts higher than the design output voltage.

R7 is a load resistor for Q4, which together form an inverting gain stage driving the output pair Q2 and Q3.

D6 is a reference Zener diode which conducts through R8 and the base of Q4 to provide negative feedback when the output of the circuit reaches the design voltage.

D5 is a higher voltage Zener diode which conducts through R9 to shut down the circuit when very high over voltage is applied to the input, as in the case of accidental connection to the landline.

Figure 5:
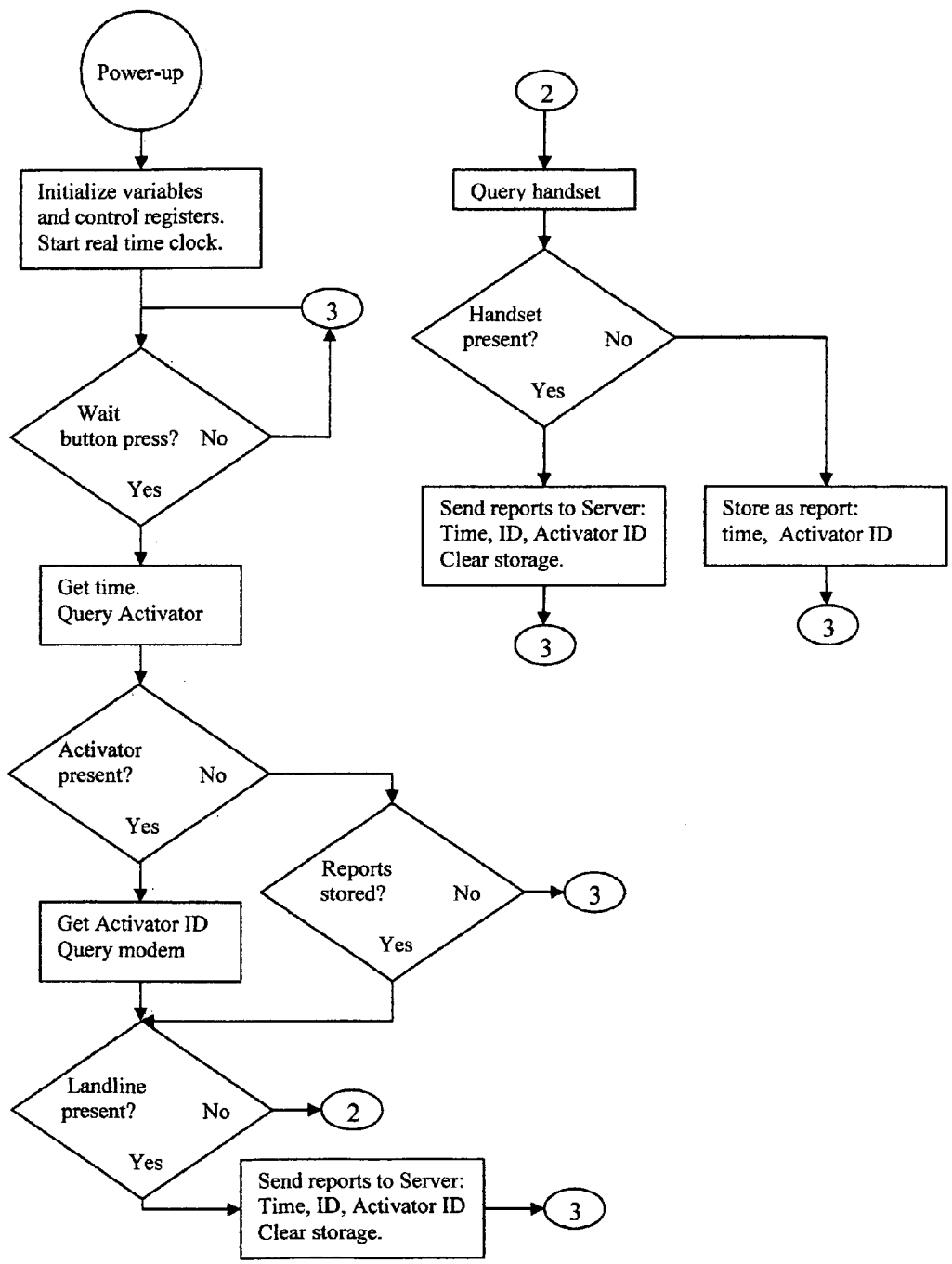
FIG. 5 is a flow chart of a preferred embodiment of the firmware program functioning in monitor 1 of FIG. 1.

FIG. 5 is a flow chart of a preferred embodiment of the firmware program functioning in monitor 1 of

FIG. 1.

Figure 6:
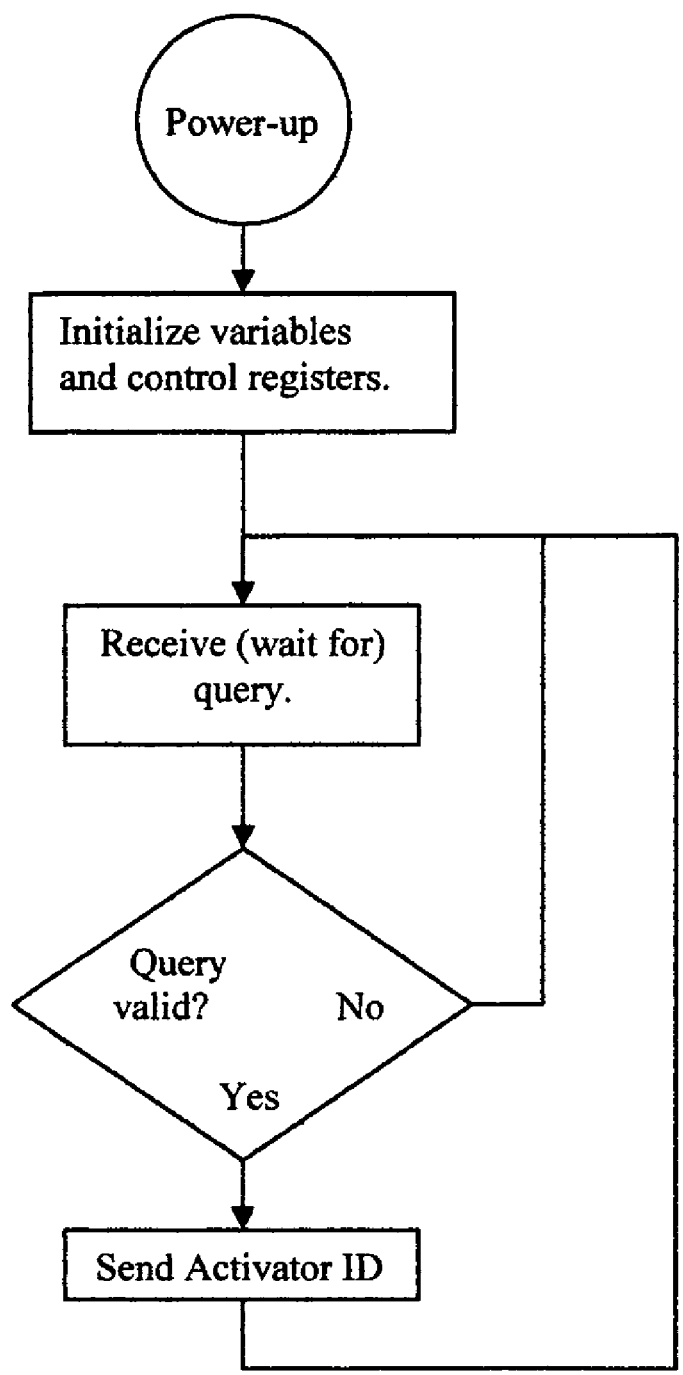
FIG. 6 is a flow chart of a preferred embodiment of the firmware program functioning in location identifying means 2 of FIG. 1.

FIG. 6 is a flow chart of a preferred embodiment of the firmware program functioning in location identifying means 2 of FIG. 1.

Figure 7:
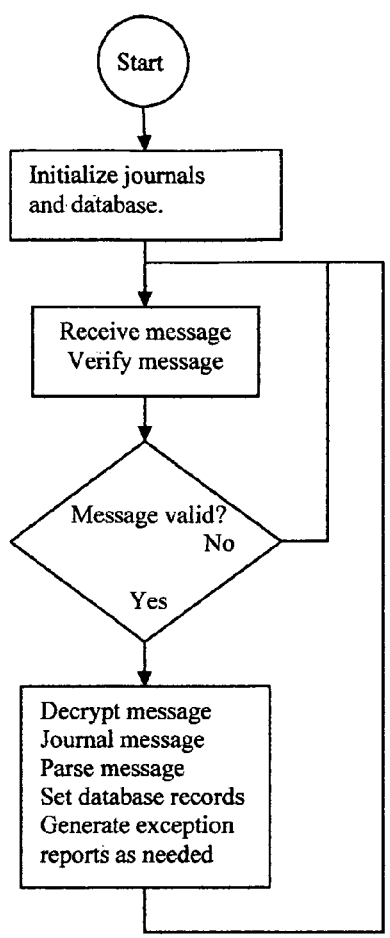
FIG. 7 is a flow chart of a preferred embodiment of software program functioning in reference database server 6 of FIG. 1, to capture and decrypt messages from monitor 1 of FIG. 1, extract the data from each message, journal these messages, and apply the data to update the reference database in reference database server 6.

FIG. 7 is a flow chart of a preferred embodiment of software program functioning in reference database server 6 of FIG. 1, to capture and decrypt messages from monitor 1 of FIG. 1, extract the data from each message, journal these messages, and apply the data to update the reference database in reference database server 6.

Figure 8:
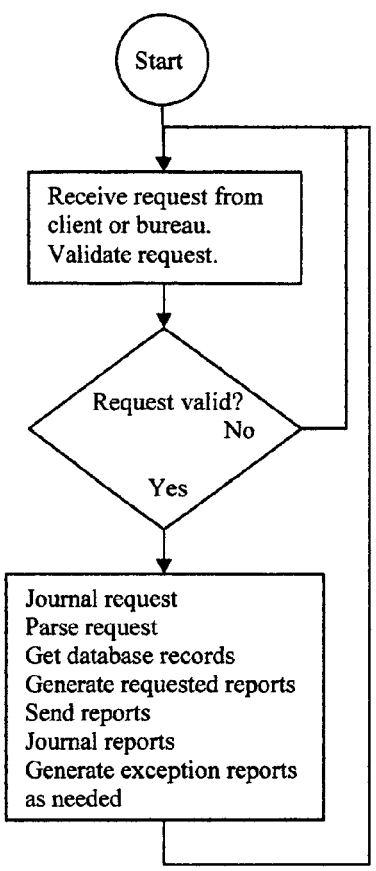
FIG. 8 is a flow chart of a preferred embodiment of software program functioning in reference database server 6 of FIG. 1, to transmit update data from the reference database to client agency computer 7 and bureau computer 8, for display, report generation, and update of the local database in these computers by software programs depicted in FIG. 10 and FIG. 11.
Figure 10:
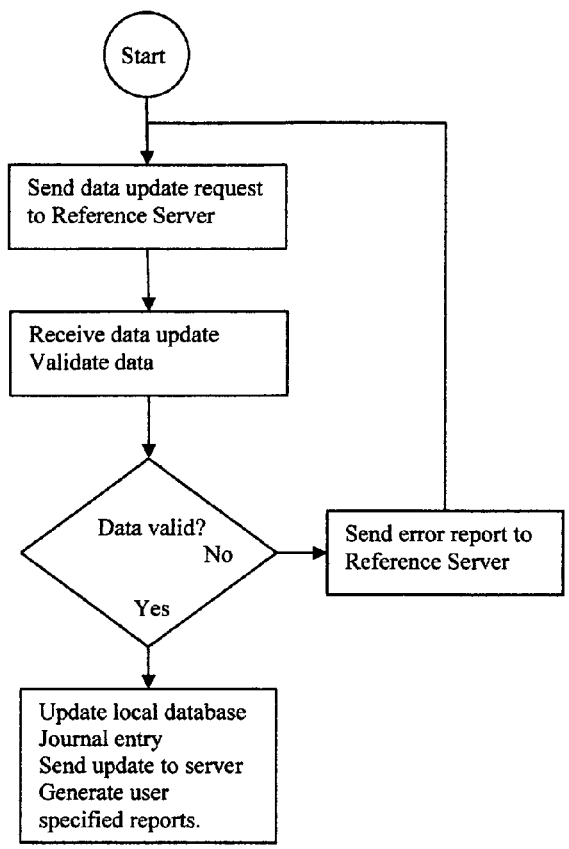
FIG. 10 is a flow chart of a preferred embodiment of the software functioning in client agency computer 7 of FIG. 1, to provide automated update of the local database with data from reference database server 6 of FIG. 1.
Figure 11:
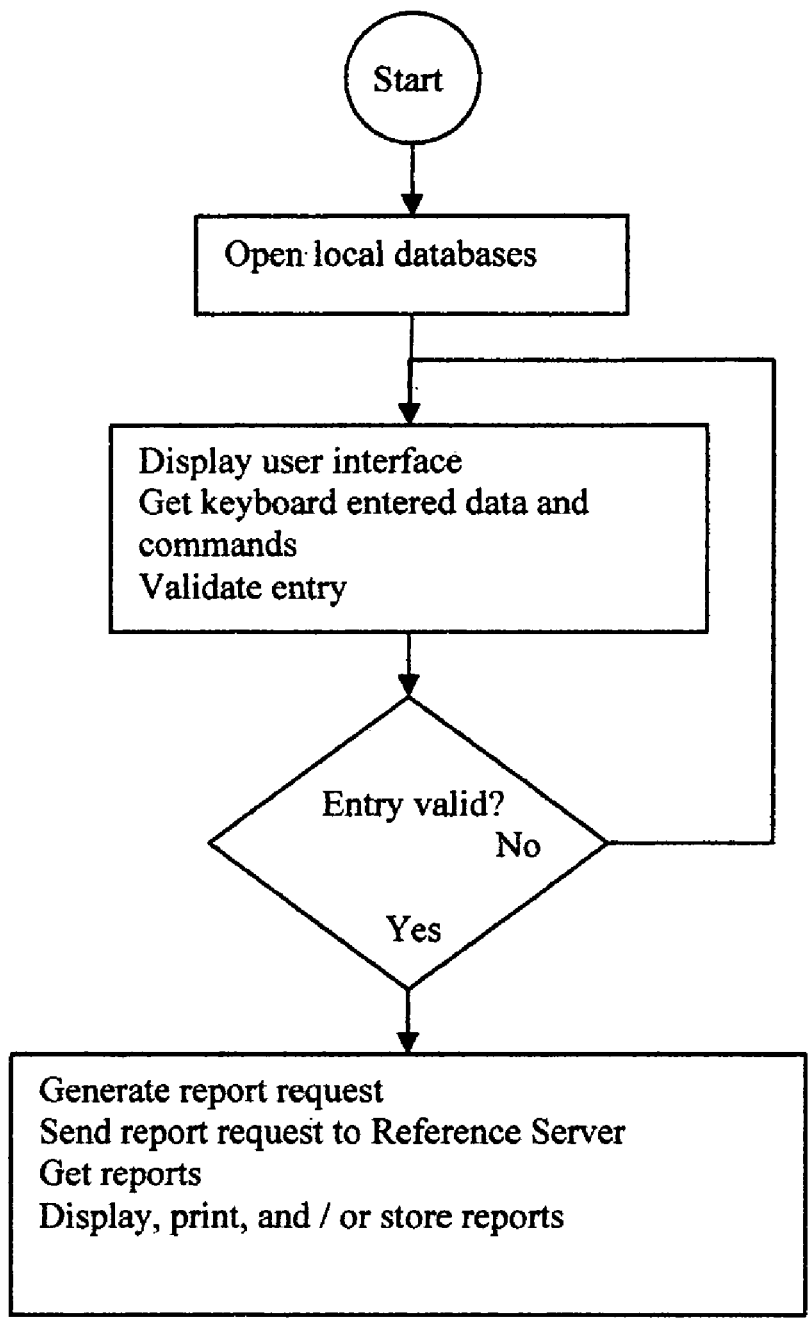
FIG. 11 is a flow chart of a preferred embodiment of the software program functioning in bureau computer 8 of FIG. 1, to provide a convenient means to request, display, print, and store reports from reference database server 6 of FIG. 1.

FIG. 8 is a flow chart of a preferred embodiment of software program functioning in reference database server 6 of FIG. 1, to transmit update data from the reference database to client agency computer 7 and bureau computer 8, for display, report generation, and update of the local database in these computers by software programs depicted in FIG. 10 and FIG. 11.

Figure 9:
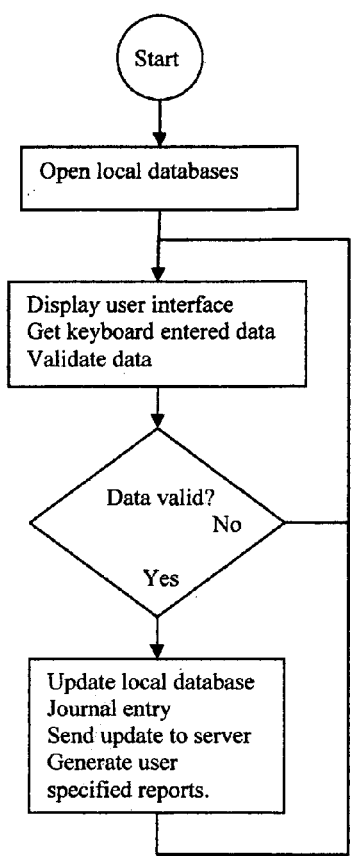
FIG. 9 is a flow chart of a preferred embodiment of the software program functioning in client agency computer 7 of FIG. 1, to provide a convenient means to enter and edit data in the local database, and to generate reports by operator manual entry of data and commands.

FIG. 9 is a flow chart of a preferred embodiment of the software program functioning in client agency computer 7 of FIG. 1, to provide a convenient means to enter and edit data in the local database, and to generate reports by operator manual entry of data and commands.

FIG. 10 is a flow chart of a preferred embodiment of the software functioning in client agency computer 7 of FIG. 1, to provide automated update of the local database with data from reference database server 6 of FIG. 1.

FIG. 11 is a flow chart of a preferred embodiment of the software program functioning in bureau computer 8 of FIG. 1, to provide a convenient means to request, display, print, and store reports from reference database server 6 of FIG. 1.

We claim:

1. A system to expedite and automate recording of arrival and departure times of an operator in a mobile workforce, comprising:

a handheld operator identifying means carried by the operator including a controller, a real time clock calendar, a communication interface, a data communication means, an operator control switch to initiate operation, a location reading means, and a visual and audible alarm, a storage means to retain unique identifying symbol, a main power battery, and a back up battery, wherein the back up battery supplies power to the operator identifying device during replacing the main power battery, the operator identifying device being configured to record the arrival and departure time of the operator;

a location identifying means, being securely mounted to a known location at a work site, having a location identification responder contained therein; and a tamper evident mounting pad electrically connected to a back of the location identifying means to securely mount the location identifying means to a wall to provide a electrical resistance value that is within a specified range only when location identifying means and the tamper evident mounting pad are properly installed, wherein upon removing the identifying means from the wall, the electrical resistance value of the location identifying means is permanently changed;

wherein upon arrival to the work site, the operator connects the handheld operator identifying means to the location identifying means, and initiates the location reading means to transmit an operating power signal and an encoded unique identifying symbol signal to the location identification responder via communication interface, the location identification responder wakes up and processes the encoded unique identifying symbol signal, and transmits a location data to the location reading means if the encoded unique identifying symbol signal is valid;

wherein the operator identifying means receives the response signal and detects the current location based on the location data, and adds time and date supplied from the real time clock calendar a server data processing means located at a remote location, wherein the operator identification device configured to connect to the server data processing means to send an encoded message containing the current location, time, date, and an operator unique identification to the server via data communication means after completing communication with the location identifying means;

wherein the sever data processing means comprising a data transmission means whereby the data processing means is able to report operator arrival and departure entries to a subscribing customers and regulating, funding, or authorizing agencies.

2. The system as in claim 1, wherein the data communication means is a modem connectable to a public switched telephone network.

3. The system as in claim 1, wherein the data communication means is a connection to a controllable cellular telephone handset, said handset controllably connectable to a dial-up modem portal of an Internet.

4. The system as in claim 1, wherein the data communication means is a connection to a controllable cellular telephone handset, said handset controllably connectable to an Internet, and controllably able to send data messages to the data processing means.

5. The system as in claim 1, wherein the location reading means is an active or passive optical scanning means able to detect and decode an optically or graphically encoded tag or label.

6. The system as in claim 1, wherein the location reading means is a magnetic strip card reader.

7. The system as in claim 1, wherein the location reading means is a radio frequency tag reader.

8. The system as in claim 1, further comprises at least one of a biometric sensor and a fingerprint scanner configured to verify operator identity.

\* \* \* \* \*